United States Patent
Lee et al.

(10) Patent No.: US 9,822,846 B2
(45) Date of Patent: Nov. 21, 2017

(54) PLANETARY GEAR TRAIN OF AUTOMATIC TRANSMISSION FOR A VEHICLE

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: Hyunda Motor Company, Seoul (KR)

( * ) Notice: Subject to any disclaimer, the term of this patent is extended or adjusted under 35 U.S.C. 154(b) by 114 days.

(21) Appl. No.: 14/925,781

(22) Filed: Oct. 28, 2015

(65) Prior Publication Data

US 2016/0327130 A1    Nov. 10, 2016

(30) Foreign Application Priority Data

May 6, 2015 (KR) .................. 10-2015-0063354

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
CPC .................. F16H 2200/2012; F16H 2200/2048
See application file for complete search history.

(56) References Cited

U.S. PATENT DOCUMENTS

| | | | | |
|---|---|---|---|---|
| 2007/0072731 A1* | 3/2007 | Klemen | ............... | F16H 3/66 475/276 |
| 2007/0099741 A1* | 5/2007 | Klemen | ............... | F16H 3/66 475/280 |
| 2012/0172173 A1* | 7/2012 | Wittkopp | ............... | F16H 3/66 475/277 |
| 2014/0018204 A1* | 1/2014 | Mellet | ............... | F16D 25/06 475/275 |
| 2014/0248989 A1* | 9/2014 | Hart | ............... | F16H 3/62 475/276 |

FOREIGN PATENT DOCUMENTS

| | | |
|---|---|---|
| KR | 10-2013-0031456 A | 3/2013 |
| KR | 10-2014-0046240 A | 4/2014 |
| KR | 10-1448789 B1 | 10/2014 |
| KR | 10-1459477 B1 | 11/2014 |

* cited by examiner

Primary Examiner — Tisha Lewis
(74) Attorney, Agent, or Firm — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and seven friction elements disposed to selectively connect the rotation elements and to selectively connect the rotation elements with a transmission housing.

11 Claims, 2 Drawing Sheets

FIG. 2

|  | B1 | B2 | B3 | C1 | C2 | C3 | C4 | Gear ratio | Step ratio | Span of shift ratio |
|---|---|---|---|---|---|---|---|---|---|---|
| 1ST |  |  | ● |  | ● |  | ● | 4.626 | 1.478 | 9.364 |
| 2ND |  |  | ● |  |  | ● | ● | 3.13 | 1.431 |  |
| 3RD | ● |  | ● |  |  | ● |  | 2.188 | 1.350 |  |
| 4TH |  |  | ● | ● |  | ● |  | 1.621 | 1.334 |  |
| 5TH | ● |  |  | ● |  | ● |  | 1.215 | 1.215 |  |
| 6TH |  |  |  | ● |  | ● | ● | 1 | 1.170 |  |
| 7TH | ● |  |  | ● |  |  | ● | 0.855 | 1.208 |  |
| 8TH |  | ● |  | ● |  |  | ● | 0.708 | 1.178 |  |
| 9TH | ● | ● |  | ● |  |  |  | 0.601 | 1.217 |  |
| 10TH |  | ● |  | ● | ● |  |  | 0.494 |  |  |
| REV |  | ● | ● |  | ● |  |  | -5.103 |  |  |

PLANETARY GEAR TRAIN OF AUTOMATIC TRANSMISSION FOR A VEHICLE

CROSS-REFERENCE TO RELATED APPLICATION

The present application claims priority to Korean Patent Application No. 10-2015-0063354 filed May 6, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train for an automatic transmission of a vehicle that improves power delivery performance and fuel efficiency as a consequence of achieving ten forward speed stages using a minimum number of constituent elements, enlarging a span of shift ratios, and almost linearly increasing or decreasing step ratios between speed stages.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of transmission speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8-speed automated transmissions have tended to be achieved, and the research and development of a planetary gear train capable of implementing more transmission steps have also been actively conducted.

Since a span of shift ratios of the recent 8-speed automatic transmission is merely 6.5 to 7.5, the 8-speed automatic transmission has no great effect of improving fuel efficiency.

In addition, since step ratios between transmission steps may not be increased or decreased linearly in a case in which a span of shift ratios of the 8-speed automatic transmission is greater than or equal to 9.0, driving efficiency of an engine and drivability of a vehicle may be deteriorated. Accordingly, there is a need for development of a highly efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving ten forward speed stages and one reverse speed stage using a minimum number of constituent elements, by enlarging a span of shift ratios, and by almost linearly increasing or decreasing step ratios between transmission steps.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and seven friction elements disposed to selectively connect the rotation elements and to selectively connect the rotation elements with a transmission housing, in which the input shaft may be continuously connected to the second rotation element and the seventh rotation element, the output shaft may be continuously connected to the eleventh rotation element, the first rotation element may be continuously connected to the sixth rotation element, the first rotation element may be continuously connected to the tenth rotation element, the second rotation element may be continuously connected to the seventh rotation element, the fifth rotation element may be continuously connected to the ninth rotation element, and three friction elements among seven friction elements may be operated at each speed stage.

The fourth rotation element may be selectively connected to the transmission housing, the eighth rotation element may be selectively connected to the transmission housing, the twelfth rotation element may be selectively connected to the transmission housing, the output shaft may be selectively connected to the third rotation element, the output shaft may be selectively connected to the fourth rotation element, and the input shaft may be selectively connected to the eighth rotation element.

The first, second, and third rotation elements of the first planetary gear set may be a sun gear, a planet carrier, and a ring gear, the fourth, fifth, and sixth rotation elements of the second planetary gear set may be a sun gear, a planet carrier, and a ring gear, the seventh, eighth, and ninth rotation elements of the third planetary gear set may be a sun gear, a planet carrier, and a ring gear, and the tenth, eleventh, and twelfth rotation elements of the fourth planetary gear set may be a sun gear, a planet carrier, and a ring gear.

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, seven friction elements disposed to selectively connect the rotation shafts with and to selectively connect the rotation shafts with a transmission housing, a first rotation shaft including the first, sixth, and tenth rotation elements, a second rotation shaft including the second and seventh rotation elements and directly connected to the input shaft, a third rotation shaft including the third rotation element, a fourth rotation shaft including the fourth rotation element and selectively connected to a transmission housing, a fifth rotation shaft including the fifth and ninth rotation elements, a sixth rotation shaft including the eighth rotation element and selectively connected to the first and second rotation shafts and the transmission housing, a seventh rotation shaft including the eleventh rotation element and selectively connected to the third and fourth rotation shafts, and directly connected to the output shaft, and an eighth rotation shaft including the twelfth rotation element and selectively connected to the transmission housing.

The first planetary gear set may be a single-pinion planetary gear set, in which the first rotation element may be a first sun gear, the second rotation element may be a first planet carrier, and the third rotation element may be a first ring gear, the second planetary gear set may be a single-pinion planetary gear set, in which the fourth rotation element may be a second sun gear, the fifth rotation element may be a second planet carrier, and the sixth rotation element may be a second ring gear, the third planetary gear set may be a single-pinion planetary gear set, in which the seventh rotation element may be a third sun gear, the eighth rotation element may be a third planet carrier, and the ninth rotation element may be a third ring gear, the fourth planetary gear may be a single-pinion planetary gear set, the tenth rotation element may be a fourth sun gear, the eleventh rotation element may be a fourth planet carrier, and the twelfth rotation element may be a fourth ring gear.

The first, second, third, and fourth planetary gear sets may be disposed in a sequence of the third, first, second, and fourth planetary gear sets from an engine side.

The seven friction elements may include a first clutch selectively connecting the third and seventh rotation shafts, a second clutch selectively connecting the fourth and seventh rotation shafts, a third clutch selectively connecting the second and sixth rotation shafts, a fourth clutch selectively connecting the first and sixth rotation shafts, a first brake selectively connecting the fourth rotation shaft and the transmission housing, a second brake selectively connecting the sixth rotation shaft and the transmission housing, and a third brake selectively connecting the eighth rotation shaft and the transmission housing.

Shift speed stages achieved by selectively operating the seven friction elements may include a first forward speed stage achieved by simultaneous operation of the second and fourth clutches and the third brake, a second forward speed stage achieved by simultaneous operation of the third and fourth clutches and the third brake, a third forward speed stage achieved by simultaneous operation of the third clutch and the first and third brakes, a fourth forward speed stage achieved by simultaneous operation of the first and third clutches and the third brake, a fifth forward speed stage achieved by simultaneous operation of the first and third clutches and the first brake, a sixth forward speed stage achieved by simultaneous operation of the first, third, and fourth clutches, a seventh forward speed stage achieved by simultaneous operation of the first and fourth clutch and the first brake, an eighth forward speed stage achieved by simultaneous operation of the first and fourth clutches and the second brake, a ninth forward speed stage achieved by simultaneous operation of the first clutch and the first and second brakes, a tenth forward speed stage achieved by simultaneous operation of the first and second clutches and the second brake, and a reverse speed stage achieved by simultaneous operation of the second clutch and the second and third brakes.

According to various aspects of the present invention, a planetary gear train of an automatic transmission for a vehicle may include an input shaft receiving torque of an engine, an output shaft outputting changed torque of the engine, a first planetary gear set including first, second and third rotation elements, a second planetary gear set including fourth, fifth and sixth rotation elements, a third planetary gear set including seventh, eighth and ninth rotation elements, a fourth planetary gear set including tenth, eleventh and twelfth rotation elements, a first rotation shaft including the first, sixth, and tenth rotation elements, a second rotation shaft including the second and seventh rotation elements and directly connected to the input shaft, a third rotation shaft including the third rotation element, a fourth rotation shaft including the fourth rotation element and selectively connected to a transmission housing, a fifth rotation shaft including the fifth and ninth rotation elements, a sixth rotation shaft including the eighth rotation element and selectively connected to the first and second rotation shafts and the transmission housing, a seventh rotation shaft including the eleventh rotation element and selectively connected to the third and fourth rotation shafts, and directly connected to the output shaft, an eighth rotation shaft including the twelfth rotation element and selectively connected to the transmission housing, a first clutch selectively connecting the third and seventh rotation shafts, a second clutch selectively connecting the fourth and seventh rotation shafts, a third clutch selectively connecting the second and sixth rotation shafts, a fourth clutch selectively connecting the first and sixth rotation shafts, a first brake selectively connecting the fourth rotation shaft and the transmission housing, a second brake selectively connecting the sixth rotation shaft and the transmission housing, and a third brake selectively connecting the eighth rotation shaft and the transmission housing.

A planetary gear train of an automatic transmission for a vehicle may include an input shaft receiving torque of an engine, an output shaft outputting changed torque of the engine, a first planetary gear set being a single-pinion planetary gear set, and including a first sun gear, a first planet carrier and a first ring gear, a second planetary gear set being a single-pinion planetary gear set, and including a second sun gear, a second planet carrier and a second ring gear, a third planetary gear set being a single-pinion planetary gear set, and including a third sun gear, a third planet carrier and a third ring gear, a fourth planetary gear set being a single-pinion planetary gear set, and including a fourth sun gear, a fourth planet carrier and a fourth ring gear, a first rotation shaft including the first sun gear, the second ring gear and the fourth sun gear, a second rotation shaft including the first planet carrier and the third sun gear, and directly connected to the input shaft, a third rotation shaft including the first ring gear, a fourth rotation shaft including the second sun gear, and selectively connected to the transmission housing, a fifth rotation shaft including the second planet carrier and the third ring gear, a sixth rotation shaft including the third planet carrier, and selectively connected to the first and second rotation shafts and the transmission housing, a seventh rotation shaft including the fourth planet carrier and selectively connected to the third and fourth rotation shafts, and directly connected to the output shaft, an eighth rotation shaft including the fourth ring gear and selectively connected to the transmission housing, and seven friction elements disposed to selectively connect the rotation shafts and to selectively connect the rotation shafts with a transmission housing.

Various embodiments of the present invention may achieve ten forward speed stages and one reverse speed stage by combining four planetary gear sets that are simple planetary gear sets with seven friction elements.

In addition, engine driving efficiency may be maximized by achieving a span of shift ratios to be greater than or equal to 9.0.

In addition, drivability such as acceleration before and after the shift and rhythm of engine speed may be improved by almost linearly increasing or decreasing step ratios between transmission steps.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to the exemplary planetary gear train according to the present invention.

Figure 1:
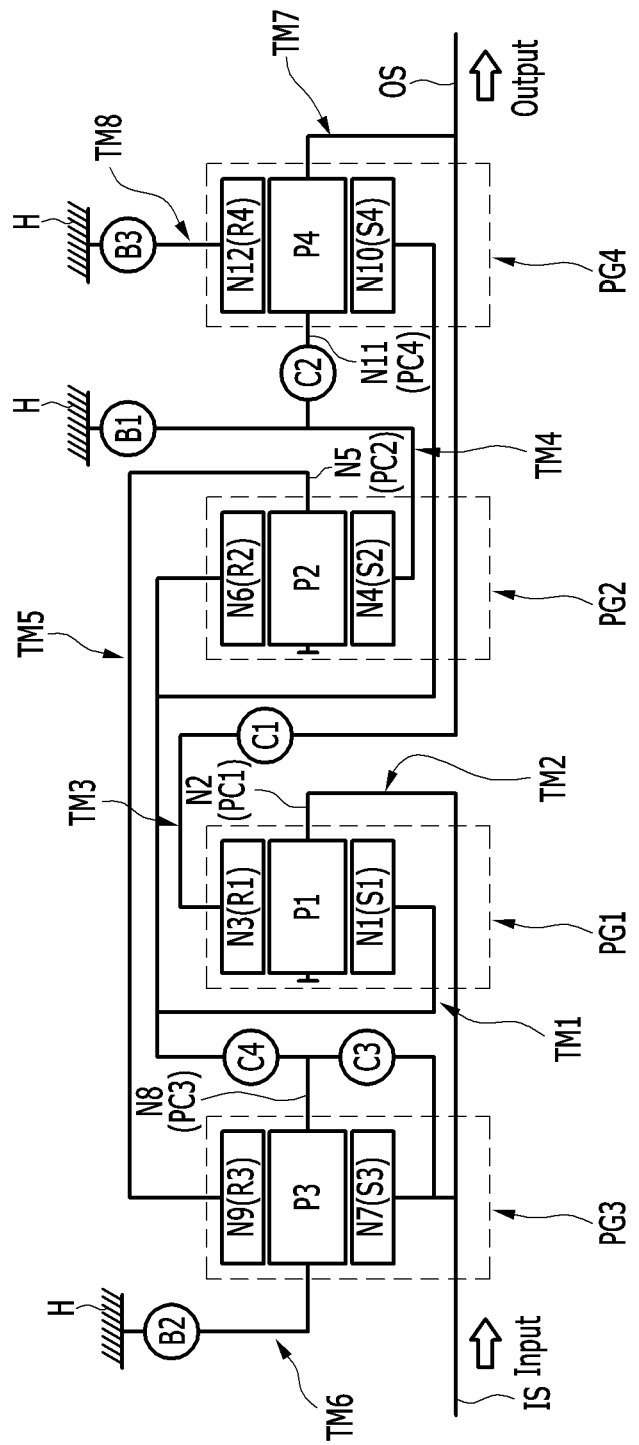
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to a first exemplary embodiment of the present invention.

Referring to FIG. 1, the planetary gear train according to various embodiments of the present invention includes first, second, third, and fourth planetary gear sets PG1, PG2, PG3, and PG4 disposed on the same axis, and an input shaft IS, an output shaft OS, eight rotation shafts TM1 to TM8 directly connecting to each other through respective rotation elements of the first, second, third, and fourth planetary gear sets PG1, PG2, PG3, and PG4, seven friction elements C1 to C4 and B1 to B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the third, first, second, and fourth planetary gear sets PG3, PG1, PG2, and PG4 from an engine side.

The input shaft IS is an input member, and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N1, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a single-pinion planetary gear set includes a third sun gear S3 which is a seventh rotation element N7, a third planet carrier PC3 which is an eighth rotation element N8 that supports a third pinion P3 which outer-engages with the third sun gear S3 which is the seventh rotation element N7, and a third ring gear R3 which is a ninth rotation element N9 which inner-engages with the third pinion P3 as the rotation elements.

The fourth planetary gear set PG4 as a single-pinion planetary gear set includes a fourth sun gear S4 which is a tenth rotation element N10, a fourth planet carrier PC4 which is an eleventh rotation element N11 that supports a fourth pinion P4 which outer-engages with the fourth sun gear S4 which is the tenth rotation element N10, and a fourth ring gear R4 which is a twelfth rotation element N12 which inner-engages with the fourth pinion P4 as the rotation elements.

In the first, second, third, and fourth planetary gear sets PG1, PG2, PG3, and PG4, the first rotation element N1 is directly connected to the sixth and tenth rotation elements N6 and N10, the second rotation element N2 is directly connected to the seventh rotation element N7, and the fifth rotation element N5 is directly connected to the ninth rotation element N9 so as to be operated with a total of eight rotation shafts TM1 to TM8.

Configurations of the eight rotation shafts TM1 to TM8 will be described below.

The first rotation shaft TM 1 includes the first rotation element N1 (the first sun gear S1), the sixth rotation element N6 (the second ring gear R2), and the tenth rotation element N10 (the fourth sun gear S4).

The second rotation shaft TM2 includes the second rotation element N2 (the first planet carrier PC1) and the seventh rotation element N7 (the third sun gear S3), and is directly connected to the input shaft IS so as to continuously be operated as an input element.

The third rotation shaft TM3 includes the third rotation element N3 (the first ring gear R1).

The fourth rotation shaft TM4 includes the fourth rotation element N4 (the second sun gear S2) and is selectively connected to the transmission housing H.

The fifth rotation shaft TM5 includes the fifth rotation element N6 (the second planet carrier PC2) and the ninth rotation element N9 (the third ring gear R3).

The sixth rotation shaft TM6 includes the eighth rotation element N8 (the third planet carrier PC3), and is selectively connected to the first rotation shaft TM1 and the second rotation shaft TM2 and the transmission housing H.

The seventh rotation shaft TM7 includes the eleventh rotation element N11 (the fourth planet carrier PC4) and is selectively connected to the third and fourth rotation shafts TM3 and TM4, and is directly connected to the output shaft OS so as to continuously be operated as an output element.

The eighth rotation shaft TM8 includes the twelfth rotation element N12 (the fourth ring gear R4) and is selectively connected to the transmission housing H.

In addition, among the rotation shafts TM1 to TM8, four clutches C1, C2, C3, and C4 which are friction elements are disposed at connection portions where the rotation shafts are connected to each other.

In addition, among the rotation shafts TM1 to TM8, three brakes B1, B2, and B3 which are friction elements are disposed at connection portions between any one rotation shaft and the transmission housing H.

The seven friction elements C1 to C4 and B1 to B3 will be described in further detail.

The first clutch C1 is interposed between the third rotation shaft TM3 and the seventh rotation shaft TM7, and selectively connects the third rotation shaft TM3 and the seventh rotation shaft TM7.

The second clutch C2 is interposed between the fourth rotation shaft TM4 and the seventh rotation shaft TM7, and selectively connects the fourth rotation shaft TM4 and the seventh rotation shaft TM7.

The third clutch C3 is interposed between the second rotation shaft TM2 and the sixth rotation shaft TM6, and selectively connects the second rotation shaft TM2 and the sixth rotation shaft TM6.

The fourth clutch C4 is interposed between the first rotation shaft TM1 and the sixth rotation shaft TM6, and selectively connects the first rotation shaft TM1 and the sixth rotation shaft TM6.

The first brake B1 is interposed between the fourth rotation shaft TM4 and the transmission housing H, and selective causes the fourth rotation shaft TM4 to be operated as a fixed element.

The second brake B2 is interposed between the sixth rotation shaft TM6 and the transmission housing H, and selective causes the sixth rotation shaft TM6 to be operated as a fixed element.

The third brake B3 is interposed between the eighth rotation shaft TM8 and the transmission housing H, and selective causes the eighth rotation shaft TM8 to be operated as a fixed element.

The friction elements including the first, second, third, and fourth clutches C1, C2, C3, and C4 and the first, second, and third brakes B1, B2, and B3 may be multi-plate friction elements of a wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention. Shifting processes in the various embodiments of the present invention will be described in further detail.

A first forward speed stage 1ST is achieved by simultaneous operation of the second and fourth clutches C2 and C4 and the third brake B3. In a state that the fourth rotation shaft TM4 is connected to the seventh rotation shaft TM7 by operation of the second clutch C2, the first rotation shaft TM1 is connected to the sixth rotation shaft TM6 by operation of the fourth clutch C4, the input is made into the second rotation shaft TM2, and the eighth rotation shaft TM8 is operated as the fixed element by operation of the third brake B3, the first forward speed stage 1ST is achieved.

A second forward speed stage 2ND is achieved by simultaneous operation of the third and fourth clutches C3 and C4 and the third brake B3. In a state that the second rotation shaft TM2 is connected to the sixth rotation shaft TM6 by operation of the third clutch C3, the first rotation shaft TM1 is connected to the sixth rotation shaft TM6 by operation of the fourth clutch C4, the input is made into the second rotation shaft TM2, and the eighth rotation shaft TM8 is operated as the fixed element by operation of the third brake B3, the second forward speed stage 2ND is achieved.

A third forward speed stage 3RD is achieved by simultaneous operation of the third clutch C3 and the first and third brakes B1 and B3. In a state that the second rotation shaft TM2 is connected to the sixth rotation shaft TM6 by operation of the third clutch C3 and the input is made into the second rotation shaft TM2, and the fourth and eighth rotation shafts TM4 and TM8 are operated as the fixed elements by operation of the first and third brakes B1 and B3, the third forward speed stage 3RD is achieved.

A fourth forward speed stage 4TH is achieved by simultaneous operation of the first and third clutches C1 and C3 and the third brake B3. In a state that the third rotation shaft TM3 is connected to the seventh rotation shaft TM7 by operation of the first clutch C1, the second rotation shaft TM2 is connected to the sixth rotation shaft TM6 by operation of the third clutch C3, the input is made into the second rotation shaft TM2, and the eighth rotation shaft TM8 is operated as the fixed element by operation of the third brake B3, the fourth forward speed stage 4TH is achieved.

A fifth forward speed stage 5TH is achieved by simultaneous operation of the first and third clutches C1 and C3 and the first brake B1. In a state that the third rotation shaft TM3 is connected to the seventh rotation shaft TM7 by operation of the first clutch C1, the second rotation shaft TM2 is connected to the sixth rotation shaft TM6 by operation of the third clutch C3 and input is made into the second rotation shaft TM2, and the fourth rotation shaft TM4 is operated as the fixed element by operation of the first brake B1, the fifth forward speed stage 5TH is achieved.

A sixth forward speed stage 6TH is achieved by simultaneous operation of the first, third, and fourth clutches C1, C3, and C4. In a state that the third rotation shaft TM3 is connected to the seventh rotation shaft TM7 by operation of the first clutch C1, the second rotation shaft TM2 is connected to the sixth rotation shaft TM6 by operation of the third clutch C3, and the first rotation shaft TM1 is connected to the sixth rotation shaft TM6 by operation of the fourth clutch C4, the sixth forward speed stage 6TH for just outputting the input is achieved as all of the first, second, third, and fourth planetary gear sets PG1, PG2, PG3, and PG4 integrally rotate at the same speed.

A seventh forward speed stage 7TH is achieved by simultaneous operation of the first and fourth clutches C1 and C4 and the first brake B1. In a state that the third rotation shaft TM3 is connected to the seventh rotation shaft TM7 by operation of the first clutch C1, the first rotation shaft TM 1 is connected to the sixth rotation shaft TM6 by operation of the fourth clutch C4, the input is made into the second rotation shaft TM2, and the fourth rotation shaft TM4 is operated as the fixed element by operation of the first brake B1, the seventh forward speed stage 7TH is achieved.

An eighth forward speed stage 8TH is achieved by simultaneous operation of the first and fourth clutches C1 and C4 and the second brake B2. In a state that the third rotation shaft TM3 is connected to the seventh rotation shaft TM7 by operation of the first clutch C1, the first rotation shaft TM1 is connected to the sixth rotation shaft TM6 by operation of the fourth clutch C4, the input is made into the second rotation shaft TM2, and the sixth rotation shaft TM6 is operated as the fixed element by operation of the second brake B2, the eighth forward speed stage 8TH is achieved.

A ninth forward speed stage 9TH is achieved by simultaneous operation of the first clutch C1 and the first and second brakes B1 and B2. In a state that the third rotation shaft TM3 is connected to the seventh rotation shaft TM7 by operation of the first clutch C1, the input is made into the second rotation shaft TM2, and the fourth and sixth rotation shafts TM4 and TM6 are operated as the fixed elements by operation of the first and second brakes B1 and B2, the ninth forward speed stage 9TH is achieved.

A tenth forward speed stage 10TH is achieved by simultaneous operation of the first and second clutches C1 and C2 and the second brake B2. In a state that the third rotation shaft TM3 is connected to the seventh rotation shaft TM7 by operation of the first clutch C1, the fourth rotation shaft TM4 is connected to the seventh rotation shaft TM7 by operation of the second clutch C2, the input is made into the second rotation shaft TM2, and the sixth rotation shaft TM6 is operated as the fixed element by operation of the second brake B2, the tenth forward speed stage 10TH is achieved. Therefore, the tenth forward speed stage 10TH is achieved.

A reverse speed stage REV is achieved by simultaneous operation of the second clutch C2 and the second and third brakes B2 and B3. In a state that the fourth rotation shaft TM4 is connected to the seventh rotation shaft TM7 by operation of the second clutch C2, the input is made into the second rotation shaft TM2, and the sixth and eighth rotation shafts TM6 and TM8 are operated as the fixed elements by operation of the second and third brakes B2 and B3, the reverse speed stage REV is achieved.

The planetary gear train according to various embodiments of the present invention may achieve ten forward speed stages and one reverse speed stage by control of four planetary gear sets PG1, PG2, PG3, and PG4 with four clutches C1, C2, C3, and C4 and three brakes B1, B2, and B3.

In addition, step ratios between transmission steps are 1.2 or more except for between the sixth and seventh forward speed stages and between the eighth and ninth forward speed stages, and drivability such as acceleration before and after the shift and rhythm of engine speed may be improved by almost linearly increasing or decreasing step ratios between transmission steps.

Further, engine driving efficiency may be maximized by achieving a span of shift ratios to be greater than or equal to 9.0.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting changed torque of the engine;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements; and
    seven friction elements disposed to selectively connect the rotation elements and to selectively connect the rotation elements with a transmission housing,
    wherein the input shaft is continuously connected to the second rotation element and the seventh rotation element,
    wherein the output shaft is continuously connected to the eleventh rotation element,
    wherein the first rotation element is continuously connected to the sixth rotation element,
    wherein the first rotation element is continuously connected to the tenth rotation element,
    wherein the second rotation element is continuously connected to the seventh rotation element,
    wherein the fifth rotation element is continuously connected to the ninth rotation element,
    wherein three friction elements among seven friction elements are operated at each speed stage,
    wherein the fourth rotation element is selectively connected to the transmission housing,
    wherein the eighth rotation element is selectively connected to the transmission housing,
    wherein the twelfth rotation element is selectively connected to the transmission housing,
    wherein the output shaft is selectively connected to the third rotation element,
    wherein the output shaft is selectively connected to the fourth rotation element, and
    wherein the input shaft is selectively connected to the eighth rotation element.

2. The planetary gear train of claim 1, wherein:
    the first, second, and third rotation elements of the first planetary gear set comprise a sun gear, a planet carrier, and a ring gear, the fourth, fifth, and sixth rotation elements of the second planetary gear set comprise a sun gear, a planet carrier, and a ring gear, the seventh, eighth, and ninth rotation elements of the third planetary gear set comprise a sun gear, a planet carrier, and a ring gear, and the tenth, eleventh, and twelfth rotation elements of the fourth planetary gear set comprise a sun gear, a planet carrier, and a ring gear.

3. A planetary gear train of an automatic transmission for a vehicle, comprising:
an input shaft receiving torque of an engine;
an output shaft outputting changed torque of the engine;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
seven friction elements disposed to selectively connect the rotation shafts with and to selectively connect the rotation shafts with a transmission housing;
a first rotation shaft including the first, sixth, and tenth rotation elements;
a second rotation shaft including the second and seventh rotation elements and directly connected to the input shaft;
a third rotation shaft including the third rotation element;
a fourth rotation shaft including the fourth rotation element and selectively connected to a transmission housing;
a fifth rotation shaft including the fifth and ninth rotation elements;
a sixth rotation shaft including the eighth rotation element and selectively connected to the first and second rotation shafts and the transmission housing;
a seventh rotation shaft including the eleventh rotation element and selectively connected to the third and fourth rotation shafts, and directly connected to the output shaft; and
an eighth rotation shaft including the twelfth rotation element and selectively connected to the transmission housing.

4. The planetary gear train of claim 3, wherein:
the first planetary gear set comprises a single-pinion planetary gear set, in which the first rotation element comprises a first sun gear, the second rotation element comprises a first planet carrier, and the third rotation element comprises a first ring gear,
the second planetary gear set comprises a single-pinion planetary gear set, in which the fourth rotation element comprises a second sun gear, the fifth rotation element comprises a second planet carrier, and the sixth rotation element comprises a second ring gear,
the third planetary gear set comprises a single-pinion planetary gear set, in which the seventh rotation element comprises a third sun gear, the eighth rotation element comprises a third planet carrier, and the ninth rotation element comprises a third ring gear,
the fourth planetary gear set comprises a single-pinion planetary gear set, the tenth rotation element comprises a fourth sun gear, the eleventh rotation element comprises a fourth planet carrier, and the twelfth rotation element comprises a fourth ring gear.

5. The planetary gear train of claim 4, wherein the first, second, third, and fourth planetary gear sets are disposed in a sequence of the third, first, second, and fourth planetary gear sets from an engine side.

6. The planetary gear train of claim 3, wherein the seven friction elements comprise:
a first clutch selectively connecting the third and seventh rotation shafts;
a second clutch selectively connecting the fourth and seventh rotation shafts;
a third clutch selectively connecting the second and sixth rotation shafts;
a fourth clutch selectively connecting the first and sixth rotation shafts;
a first brake selectively connecting the fourth rotation shaft and the transmission housing;
a second brake selectively connecting the sixth rotation shaft and the transmission housing; and
a third brake selectively connecting the eighth rotation shaft and the transmission housing.

7. The planetary gear train of claim 6, wherein shift speed stages achieved by selectively operating the seven friction elements comprise:
a first forward speed stage achieved by simultaneous operation of the second and fourth clutches and the third brake;
a second forward speed stage achieved by simultaneous operation of the third and fourth clutches and the third brake;
a third forward speed stage achieved by simultaneous operation of the third clutch and the first and third brakes;
a fourth forward speed stage achieved by simultaneous operation of the first and third clutches and the third brake;
a fifth forward speed stage achieved by simultaneous operation of the first and third clutches and the first brake;
a sixth forward speed stage achieved by simultaneous operation of the first, third, and fourth clutches;
a seventh forward speed stage achieved by simultaneous operation of the first and fourth clutch and the first brake;
an eighth forward speed stage achieved by simultaneous operation of the first and fourth clutches and the second brake;
a ninth forward speed stage achieved by simultaneous operation of the first clutch and the first and second brakes;
a tenth forward speed stage achieved by simultaneous operation of the first and second clutches and the second brake; and
a reverse speed stage achieved by simultaneous operation of the second clutch and the second and third brakes.

8. A planetary gear train of an automatic transmission for a vehicle, comprising:
an input shaft receiving torque of an engine;
an output shaft outputting changed torque of the engine;
a first planetary gear set including first, second and third rotation elements;
a second planetary gear set including fourth, fifth and sixth rotation elements;
a third planetary gear set including seventh, eighth and ninth rotation elements;
a fourth planetary gear set including tenth, eleventh and twelfth rotation elements;

a first rotation shaft including the first, sixth, and tenth rotation elements;

a second rotation shaft including the second and seventh rotation elements and directly connected to the input shaft;

a third rotation shaft including the third rotation element;

a fourth rotation shaft including the fourth rotation element and selectively connected to a transmission housing;

a fifth rotation shaft including the fifth and ninth rotation elements;

a sixth rotation shaft including the eighth rotation element and selectively connected to the first and second rotation shafts and the transmission housing;

a seventh rotation shaft including the eleventh rotation element and selectively connected to the third and fourth rotation shafts, and directly connected to the output shaft;

an eighth rotation shaft including the twelfth rotation element and selectively connected to the transmission housing;

a first clutch selectively connecting the third and seventh rotation shafts;

a second clutch selectively connecting the fourth and seventh rotation shafts;

a third clutch selectively connecting the second and sixth rotation shafts;

a fourth clutch selectively connecting the first and sixth rotation shafts;

a first brake selectively connecting the fourth rotation shaft and the transmission housing;

a second brake selectively connecting the sixth rotation shaft and the transmission housing; and a third brake selectively connecting the eighth rotation shaft and the transmission housing.

9. The planetary gear train of claim 8, wherein the first planetary gear set comprises a single-pinion planetary gear set, in which the first rotation element comprises a first sun gear, the second rotation element comprises a first planet carrier, and the third rotation element comprises a first ring gear, the second planetary gear set comprises a single-pinion planetary gear set, in which the fourth rotation element comprises a second sun gear, the fifth rotation element comprises a second planet carrier, and the sixth rotation element comprises a second ring gear, the third planetary gear set comprises a single-pinion planetary gear set, in which the seventh rotation element comprises a third sun gear, the eighth rotation element comprises a third planet carrier, and the ninth rotation element comprises a third ring gear, the fourth planetary gear set comprises a single-pinion planetary gear set, the tenth rotation element comprises a fourth sun gear, the eleventh rotation element comprises a fourth planet carrier, and the twelfth rotation element comprises a fourth ring gear.

10. The planetary gear train of claim 9, wherein the first, second, third, and fourth planetary gear sets are disposed in a sequence of the third, first, second, and fourth planetary gear sets from an engine side.

11. The planetary gear train of claim 8, wherein shift speed stages achieved by selectively operating the first, second, third, and fourth clutches and the first, second, and third brakes comprise:

a first forward speed stage achieved by simultaneous operation of the second and fourth clutches and the third brake;

a second forward speed stage achieved by simultaneous operation of the third and fourth clutches and the third brake;

a third forward speed stage achieved by simultaneous operation of the third clutch and the first and third brakes;

a fourth forward speed stage achieved by simultaneous operation of the first and third clutches and the third brake;

a fifth forward speed stage achieved by simultaneous operation of the first and third clutches and the first brake;

a sixth forward speed stage achieved by simultaneous operation of the first, third, and fourth clutches;

a seventh forward speed stage achieved by simultaneous operation of the first and fourth clutch and the first brake;

an eighth forward speed stage achieved by simultaneous operation of the first and fourth clutches and the second brake;

a ninth forward speed stage achieved by simultaneous operation of the first clutch and the first and second brakes;

a tenth forward speed stage achieved by simultaneous operation of the first and second clutches and the second brake; and a reverse speed stage achieved by simultaneous operation of the second clutch and the second and third brakes.

* * * * *

UNITED STATES PATENT AND TRADEMARK OFFICE
CERTIFICATE OF CORRECTION

Page 1 of 1

PATENT NO. : 9,822,846 B2
APPLICATION NO. : 14/925781
DATED : November 21, 2017
INVENTOR(S) : KyeongHun Lee et al.

It is certified that error appears in the above-identified patent and that said Letters Patent is hereby corrected as shown below:

On the Title Page

Item (73) Assignees:
Delete:
"Hyunda Motor Company, Seoul (KR)"
And insert therefor:
--Hyundai Motor Company, Seoul (KR)--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*